(12) United States Patent
Tohyama et al.

(10) Patent No.: US 7,484,417 B2
(45) Date of Patent: Feb. 3, 2009

(54) PRESSURE SENSOR AND MANUFACTURING METHOD OF THE SAME

(75) Inventors: Shuji Tohyama, Tokyo (JP); Ikuya Miyahara, Tokyo (JP); Hayato Kobayashi, Tokyo (JP)

(73) Assignee: Nagano Keiki Co., Ltd., Tokyo (JP)

( * ) Notice: Subject to any disclaimer, the term of this patent is extended or adjusted under 35 U.S.C. 154(b) by 503 days.

(21) Appl. No.: 11/091,247

(22) Filed: Mar. 28, 2005

(65) Prior Publication Data

US 2005/0217385 A1 Oct. 6, 2005

(30) Foreign Application Priority Data

Mar. 30, 2004 (JP) .............................. 2004-100133

(51) Int. Cl.
*G01L 9/00* (2006.01)

(52) U.S. Cl. .......................................... 73/753; 73/705

(58) Field of Classification Search ............. 73/706.753
See application file for complete search history.

(56) References Cited

U.S. PATENT DOCUMENTS

| 4,939,497 A | 7/1990 | Nishida et al. | |
|---|---|---|---|
| 5,079,953 A * | 1/1992 | Martin et al. | .................. 73/718 |
| 6,422,085 B1 * | 7/2002 | Hegner et al. | .................. 73/706 |
| 7,159,464 B2 * | 1/2007 | Tohyama et al. | .............. 73/706 |
| 7,165,459 B2 * | 1/2007 | Tohyama et al. | .............. 73/715 |

FOREIGN PATENT DOCUMENTS

| JP | 5-52689 | 3/1993 |
|---|---|---|
| JP | 6-5165 | 1/1994 |
| JP | 6-314750 | 11/1994 |
| JP | 7-209115 | 8/1995 |
| JP | 10-197380 | 7/1998 |
| JP | 11-54894 | 2/1999 |
| JP | 2001-324402 | 11/2001 |
| JP | 2002-333377 | 11/2002 |

* cited by examiner

*Primary Examiner*—Andre J Allen
(74) *Attorney, Agent, or Firm*—Rankin, Hill & Clark LLP

(57) ABSTRACT

A pressure sensor includes: a main body case including a housing (1) and a joint (2); an electronic circuit (3) housed inside the main body case to convert detected pressure into electrical signals to send out; a connecting metal piece (5), one end (51)of which abuts on an electrode (31) of the electronic circuit (3); a terminal (4), one end (41) of which is joined to the other end (52) of the connecting metal piece (5) and the other end (42) of which is disposed outside the main body case; and a cushion (7) biasing the one end (51) to the electrode (31). The one end (51) and the electrode (31) are electrically connected by biasing force of the cushion (7), which eliminates welding, enabling manufacturing at low cost.

6 Claims, 3 Drawing Sheets

PRESSURE SENSOR AND MANUFACTURING METHOD OF THE SAME

BACKGROUND OF THE INVENTION

1. Field of the Invention

The present invention relates to a pressure sensor and a method of manufacturing the same, and more specifically to a pressure sensor that converts detected pressure into electrical signals and sends out the electrical signals, and a method of manufacturing the same.

2. Description of Related Art

In conventional pressure sensors, a main body case is formed by covering a joint with a housing and joining the both together (for instance, refer to Reference: Japanese Patent Laid Open Publication No. 2001-324402, FIG. 1 to FIG. 9). The joint is attached to a tube or the like through which a fluid to be measured flows. The main body case contains a pressure detector such as a diaphragm therein. The pressure detector comes into contact with the fluid to be measured that is introduced through the joint and detects pressure of the fluid to be measured. The main body case contains an electronic circuit therein, which converts the pressure detected by the pressure detector into electrical signals and properly performs an amplifying operation or the like. The electronic circuit is welded to one end of a terminal to have an electrical connection therewith, and the terminal takes out the electrical signals to which the amplifying operation or the like has been performed to the outside of the main body case. The other end of the terminal is protruded outside the main body case, and the electrical signals are transmitted from the one end to the other end of the terminal, in other words, from the inside to the outside of the main body case.

According to the arrangement described above, the pressure of the fluid to be measured detected by the pressure detector is converted into the electrical signals by the electronic circuit, and the electrical signals are taken out to the outside of the main body case through the terminal. The terminal is connected to a counterpart terminal, and the electrical signals are led to various sorts of equipment. Thus, the electrical signals based on the detected pressure can be used for various purposes.

In a conventional pressure sensor with the above arrangement, the electronic circuit and the terminal are welded to be electrically connected. Such welding work, however, requires more handling time and costs. In particular, since many pressure sensors are small-sized, such an expensive welding equipment as a laser welder that performs micro-spot welding are required to perform precise welding works, which incurs a very high cost including an operating cost. Moreover, it is troublesome and time-consuming to perform welding every time the pressure sensors are produced, resulting in low productivity.

SUMMARY OF THE INVENTION

An object of the present invention is to provide a pressure sensor that can take out electrical signals sent out by an electrical circuit to the outside of a main body case with a simple method and also can be manufactured at a low cost, and a manufacturing method of the same.

A pressure sensor according to an aspect of the present invention is provided with a main body case, an electrical circuit housed inside the main body case to convert detected pressure into electrical signals and send out the electrical signals, an electrical signal transmitting device, one end of which is abutted on the electrical circuit and the other end of which is disposed outside the main body case to transmit the electrical signals sent out by the electrical circuit from the one end to the other end, and a biasing unit to bias the one end of the electrical signal transmitting device to the electrical circuit.

According to the present invention, detected pressure is converted into electrical signals in an electrical circuit. The electrical signals are taken out to the outside of the main body case through the electrical signal transmitting device.

According to the present invention, since the one end of the electrical signal transmitting device is biased to the electrical circuit by the biasing unit, both of the one end of the electrical signal transmitting device and the electrical circuit are in contact with each other by biasing force thereof and therefore electrically connected.

As described above, both of the electrical circuit and the electrical signal transmitting device can be contacted with each other and electrically connected even if the electrical circuit and the electrical signal transmitting device are not welded. Thus, according to the present invention, welding portions can be reduced compared with the related art, so that handling time and cost for welding can be saved, which enhances productivity to produce pressure sensors at low cost.

According to the present invention, it is preferable that the biasing unit is an elastic member provided between an inner wall surface of the main body case and the one end of the electrical signal transmitting device.

In the invention, the elastic member is sandwiched between the inner wall surface of the main body case and the one end of the electrical signal transmitting device, and the one end of the electrical signal transmitting device is biased to the electrical circuit by elasticity of the elastic member.

According to the present invention, the elastic member constituting the biasing unit is made of material with a relatively simple structure such as rubber, urethane foam and a spring, and therefore, the biasing unit can be simplified and the pressure sensor can be manufactured easily at low cost. Additionally, according to the present invention, it is preferable that the one end of the electrical signal transmitting device and the electrical circuit are bonded by a conductive adhesive having conductivity.

In the present invention, the one end of the electrical signal transmitting device and the electrical circuit are contacted more firmly with each other by the adhesion force of the conductive adhesive. Therefore, such possibility can be reduced that the contact between the one end of the electrical signal transmitting device and the electrical circuit is disengaged and the electrical connection is released, resulting in reducing possibility of pressure sensor failures due to electrical disconnection.

It should be noted that the conductive adhesive does not disturb the electrical connection between the electrical signal transmitting device and the electrical circuit since the conductive adhesive has conductivity.

Further, according to the present invention, it is preferable that a conductive adhesive storage is provided next to an adhering part between the one end of the electrical signal transmitting device and the electrical circuit, the adhesive storage storing the conductive adhesive that overflows the adhering part.

If the amount of the conductive adhesive is excessively large when the one end of the electrical signal transmitting device and the electrical circuit are bonded by the conductive adhesive, excess conductive adhesive may overflow the adhering part between the one end of the electrical signal transmitting device and the electrical circuit. When the overflowed conductive adhesive is, for instance, stuck to a part on the electrical circuit other than the adhering part thereof, the electrical circuit may be short-circuited due to the conductivity of the conductive adhesive, which causes a failure in the pressure sensor.

In the present invention, however, since the conductive adhesive storage is provided, such a possibility can be reduced that the conductive adhesive overflowed from the adhering part between the one end of the electrical signal transmitting device and the electrical circuit is, for instance, stuck to a part on the electrical circuit other than the adhering part thereof. Thus, according to the present invention, a possibility of pressure sensor failures can be reduced.

Furthermore, according to the present invention, it is preferable that the main body case is formed by joining a first case part and a second case part with each other, the electrical signal transmitting device penetrates through the first case part, the electrical circuit is mounted on the second case part, one of the first and second case parts is provided with a protrusion, and the other one of the first and second case parts is provided with a recess engaging to the protrusion.

In manufacturing the pressure sensor of the present invention, the first case part and the second case part are joined with each other. Since the first case part is provided with the electrical signal transmitting device and the second case part is provided with the electrical circuit, the one end of the electrical signal transmitting device and the electrical circuit are in contact with each other and electrically connected when the first case part and the second case part are joined. As described above, in the present invention, a process to join the first case part and the second case part and a process to bring the electrical signal transmitting device into contact with the electrical circuit can be integrated into one process. Therefore, according to the present invention, the manufacturing process of the pressure sensor can be simplified, resulting in productivity.

The one end of the electrical signal transmitting device and the electrical circuit are housed inside the main body case, which is formed by joining first case part and the second case part together. Therefore, whether the one end of the electrical signal transmitting device and the electrical circuit come in contact with each other in a desired state can not be checked visually from the outside of the pressure sensor when the first case part and the second case part are joined. For the reason described above, there is needed a method, other than visual verification from the outside, to confirm that the one end of the electrical signal transmitting device and the electrical circuit are in contact with each other in a desired state and to assure that both of the one end of the electrical signal transmitting device and the electrical circuit are positioned properly and electrically connected with each other.

The protrusion and the recess according to the present invention provide the assuring method. The first case part and the second case part are joined with each other by engaging the protrusion into the recess. In other words, the protrusion and the recess uniquely determine a relative position between the first case part and the second case part. Since the first case part is provided with the electrical signal transmitting device and the second case part is provided with the electrical circuit, the protrusion and the recess uniquely determine a relative position between the one end of the electrical signal transmitting device and the electrical circuit. If the protrusion and the recess are formed in advance so that the one end of the electrical signal transmitting device and the electrical circuit are in contact with each other when the protrusion is engaged into the recess, the one end of the electrical signal transmitting device and the electrical circuit can be in contact with each other and electrically connected properly without visual verification from the outside.

According to another aspect of the present invention, the method of manufacturing the above-described pressure sensor of the present invention, the main body case is formed by joining the first case part and the second case part with each other, and the method includes an integral forming process to integrally form the first case part with the electrical signal transmitting device and a joining process to join the first case part and the second case part with each other in a state that the one end of the electrical signal transmitting device is in contact with the electrical circuit provided inside the second case part and the one end of the electrical signal transmitting device is biased to the electrical circuit by the biasing unit.

A conventional manufacturing method of a pressure sensor mainly includes two processes as follows: a welding process in which the one end of the terminal or the like as the electrical signal transmitting device is welded to the electronic circuit provided in the joint or the like as the second case part; a joining process in which the joint or the like is covered with the housing or the like as the first case part to join together. It should be noted that the housing or the like is provided with a hole. Before the joining process, there is another process in which the terminal or the like is inserted through the hole and the other end of the terminal or the like is protruded outside the housing, in other words, outside the main body case.

In such a conventional manufacturing method as described above, the one end of the terminal or the like and the electronic circuit need to be welded in a welding process, which requires more handling time and cost as described earlier.

In the manufacturing method according to the present invention, however, there is no need to weld the one end of the electrical signal transmitting device and the electrical circuit. Therefore, the welding portions can be reduced and handling time and costs for welding can be cut, which enhances productivity to manufacture pressure sensors at a lower cost. It should be noted that the one end of the electrical signal transmitting device and the electrical circuit can be electrically connected without welding in the present invention. In other words, in the joining process, since the biasing unit biases the one end of the electrical signal transmitting device to the electrical circuit, and the one end of the electrical signal transmitting device and the electrical circuit are in contact with each other by biasing force thereof, both the one end of the electrical signal transmitting device and the electrical circuit are electrically connected.

Additionally, in a conventional manufacturing method, the terminal or the like as the electrical signal transmitting device and the housing or the like as the first case part have been produced as separate components, which increased cost of components. Furthermore, two processes described above (the welding process and the joining process) have been required to assemble a pressure sensor using these components.

According to the present invention, however, an integrally formed component is produced from the first case part and the electrical signal transmitting device in an integral forming process, and thus, costs of components can be reduced. In addition, only one process of the joining process is needed as a process to assemble the pressure sensor using the integrally formed component. Therefore, according to the present invention, the process of pressure sensor assembling can be simplified, resulting in enhancing the productivity thereof.

Moreover, in a conventional manufacturing method, since the housing or the like and the terminal or the like are produced as separate components, there is a limit of positioning accuracy of the terminal or the like relative to the housing or the like when assembling a pressure sensor with the components. When the positioning accuracy of the terminal or the like is not sufficient, it becomes harder to connect a counterpart terminal or the like to the terminal, which therefore deteriorates the workability and prevents both of the terminal and the counterpart terminal from being electrically connected properly. As a result, a trouble is generated in terms of electrical signals transmission and an adverse influence is exerted on reliability of the pressure sensor. In the present invention, however, the first case part and the electrical signal transmitting device are integrally formed in an integral forming process. Since the positioning of the electrical signal transmitting device to the first case part can be realized with sufficient accuracy, the problem of the conventional manufacturing method described above is not generated. As described above, according to the present invention, the workability can be improved in connecting the electrical signal transmitting device (the terminal or the like) to the other electrical signal transmitting device (the counterpart terminal or the like), and at the same time the electrical connection between the both devices is secured properly, resulting in the enhancement of reliability of the pressure sensor.

Further, according to the present invention, it is preferable that a caulking process is provided to caulk a joining portion between the first case part and the second case part.

In manufacturing process of the pressure sensor, the first case part and the second case part having been joined together in the joining process need to be fixed in the joined state. As a fixing method of the first case part and the second case part, for instance, there is a welding method of the joining portion. The welding, however, involves more handling time and costs as described above. To the contrary, the joining portion between the first case part and the second case part is caulked in the present invention. In other words, it is only required to apply force to the joining portion so that the both parts are attached closely, and there is no need of expensive equipment such as a laser welder that is required in welding. Therefore, according to the present invention, the pressure sensor can be manufactured at low cost with simple working processes.

DETAILED DESCRIPTION OF PREFERRED EMBODIMENT

An embodiment of the present invention will be described below with reference to the accompanying drawings.

Figure 1:
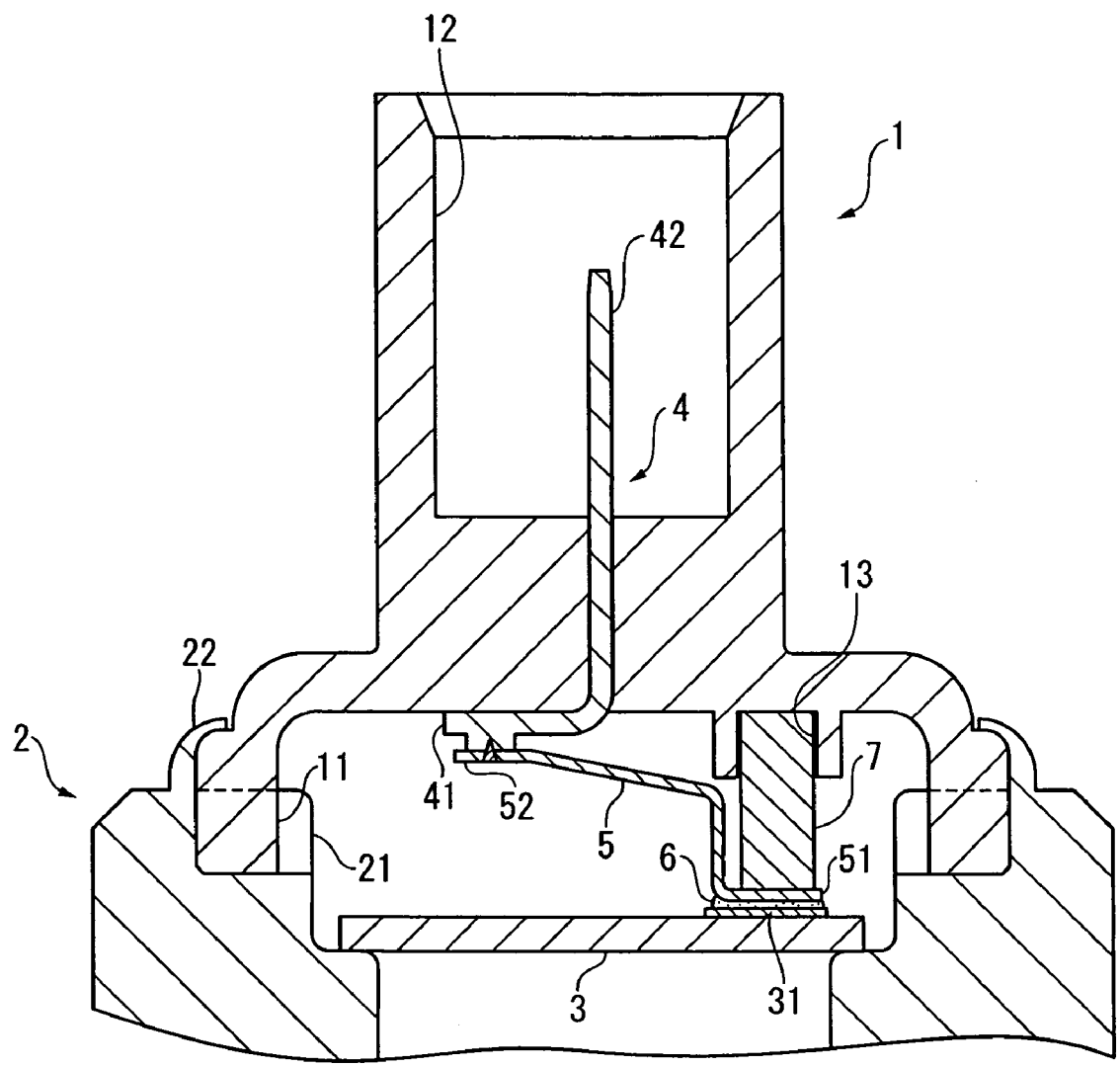
FIG. 1 is a cross section showing a pressure sensor according to an embodiment of the present invention.

FIG. 1 shows a pressure sensor according to the embodiment.

The pressure sensor of the present embodiment is provided with a housing 1 as first case part and a joint 2 as a second case part that is joined to the housing 1. The joint 2 is coupled to a tube or the like through which fluid to be measured flows, or to a container or the like in which fluid to be measured is accumulated, the joint 2 bringing the fluid to be measured into contact with a pressure detector such as a diaphragm or the like (not shown). It should be noted that not only a diaphragm but also various sorts of members such as a capsule (a vacuum chamber, a chamber), bellows (bellow), a tube or a Bourdon tube can be used as the pressure detector.

Figure 2:
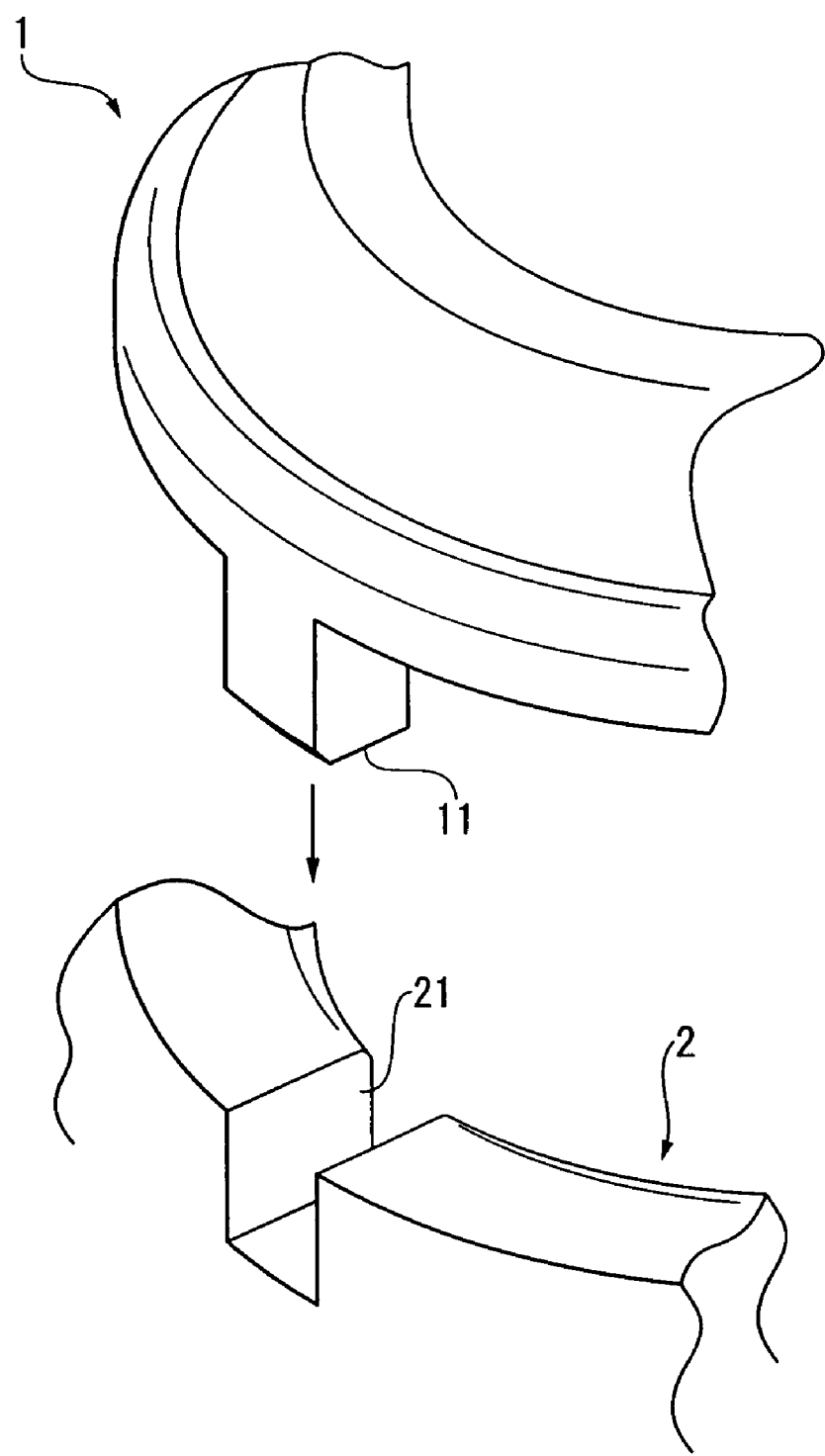
FIG. 2 is a partially enlarged view showing an assembled state of the pressure sensor according to the embodiment.

A main body case is formed by joining the housing 1 and the joint 2. As shown in FIG. 2, the housing 1 is equipped with a protrusion 11 having a substantial rectangular-solid shape on a peripheral edge thereof. The joint 2 is equipped with a recess 21 that is engaged tightly with the protrusion 11 on the peripheral edge thereof. The housing 1 and the joint 2 are joined together by engaging the protrusion 11 with the recess 21, so that a relative position between the housing 1 and the joint 2 is uniquely determined. Moreover, the housing 1 and the joint 2 are caulked at a joining portion, and a caulking portion 22 is formed in the joint 2. An O-ring or the like (not shown) is annularly fitted in the vicinity of the caulking portion 22 between the housing 1 and the joint 2 to seal between the housing 1 and the joint 2. Therefore, invasion of water or dust into the housing 1 and the joint 2 is restricted, and less probability of pressure sensor failures is expected due to adhesion of water or dust to an electronic circuit 3.

A counterpart-terminal insertion hole 12 is arranged in the housing 1 to insert a counterpart terminal described later.

Referring to FIG. 1, the electronic circuit 3 is housed inside the housing 1 and the joint 2 as an electrical circuit that converts the pressure detected by a pressure detector (not shown) into electrical signals and performs a process such as an amplifying operation for the electrical signals. The electronic circuit 3 is fixed to an inner wall surface of the joint 2. Further, the electronic circuit 3 includes an electrode 31 to send out the electrical signals processed by an amplifying operation or the like.

A terminal 4 as an electrical signal transmitting device is provided by penetrating the housing 1. The terminal 4 is integrated into the housing 1 by insert molding. One end 41 of the terminal 4 is formed along an inner wall surface of the housing 1, and the other end 42 of the terminal 4 is protruded into the counterpart-terminal insertion hole 12.

The counterpart terminal (not shown) is inserted into the counterpart-terminal insertion hole 12. The other end 42 of the terminal 4 provided inside the counterpart-terminal insertion hole 12 is electrically connected to the counterpart terminal.

There is provided a connecting metal piece 5 inside the housing 1 and the joint 2 to electrically connect the electrode 31 of the electronic circuit 3 and the one end 41 of the terminal 4. The connecting metal piece 5 has elasticity. An end 51 of the connecting metal piece 5 is bonded to the electrode 31 with a conductive adhesive 6 having conductivity and electrically connected thereto. It should be noted that an epoxy base including a silver filler, for instance, can be used as the conductive adhesive 6. Moreover, the other end 52 of the connecting metal piece 5 is joined to the one end 41 of the terminal 4 and electrically connected thereto.

The terminal 4 and the connecting metal piece 5 constitute an electrical signal transmitting device to transmit electrical signals sent out by the electrode 31 of the electronic circuit 3 from one end 51 of the connecting metal piece 5 to the other end 42 of the terminal 4.

Figure 3A:
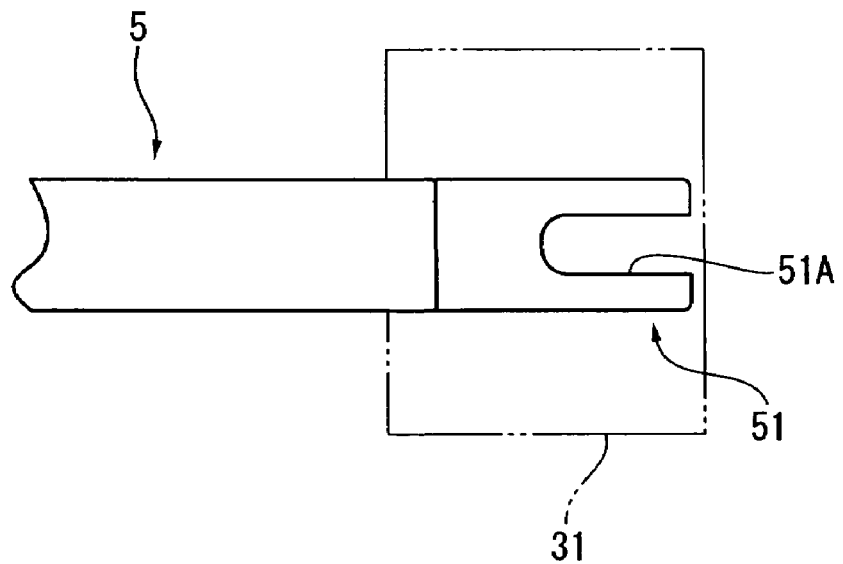
FIGS. 3A and 3B are partially enlarged views showing a bonding state of one end of a connecting metal piece and an electrode in the pressure sensor according to the embodiment.
Figure 3B:
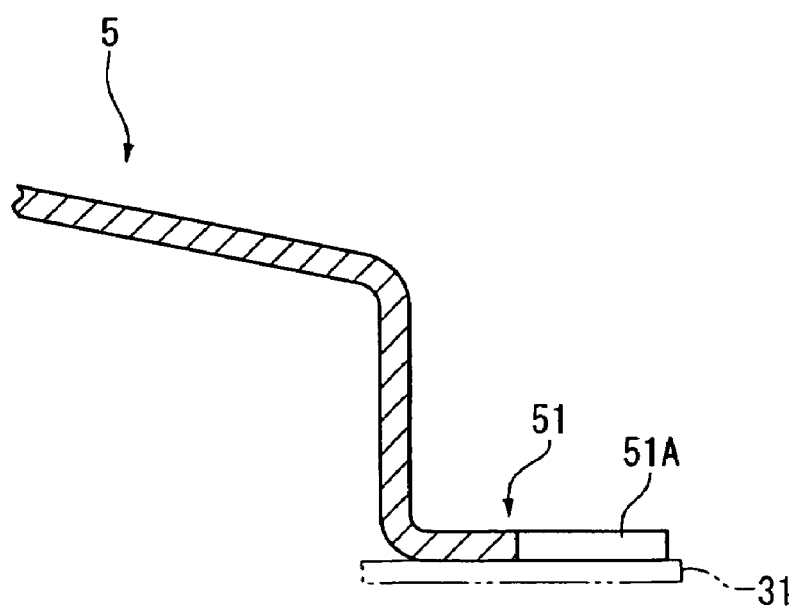

FIGS. 3A and 3B show an enlarged view of an adhering part between the one end 51 of the connecting metal piece 5 and the electrode 31 of the electronic circuit 3.

A notch 51A is formed in the one end 51 of the connecting metal piece 5.

The notch 51A is disposed adjacent to adhering part between the one end 51 of the connecting metal piece 5 as a part of the electrical signal transmitting device and the electrode 31 of the electronic circuit 3, and serves as a conductive adhesive storage that can store the conductive adhesive overflowed from the adhering part.

As shown in FIG. 1, there is provided a silicon-rubber cushion 7 as an elastic member between the inner wall surface of the housing 1 and the one end 51 of the connecting metal piece 5 as a part of the electrical signal transmitting device.

The cushion 7 is fitted into a cushion-mounting recess 13 formed on the inner wall of the housing 1 and sandwiched between the inner wall surface of the housing 1 and the one end 51 of the connecting metal piece 5. The cushion 7 biases the one end 51 of the connecting metal piece 5 to the electrode 31 of the electronic circuit 3 with its elasticity. Thus, the cushion 7 serves as a biasing unit.

In the arrangement as described above, the pressure detected by the pressure detector (not shown) is converted into electrical signals in the electronic circuit 3, which is further processed by amplifying operation or the like. The electrical signals are sent out from the electrode 31 of the electronic circuit 3, via the connecting metal piece 5 and the terminal 4 sequentially, and transmitted to the counterpart terminal which is inserted into the counterpart-terminal insertion hole 12 and electrically connected to the terminal 4. The electrical signals taken out to the outside of the housing 1 by the counterpart terminal is transmitted to various sorts of equipment by electric wires or the like and used for various purposes in the equipment.

A method of manufacturing pressure sensors according to the present embodiment will be described in the following.

A manufacturing method of a pressure sensor according to the present embodiment mainly includes assembly parts production process to produce assembly parts of the pressure sensor and a pressure sensor assembly process to assemble a pressure sensor using produced assembly parts.

In the assembly parts production process, first assembly parts and second assembly parts are produced.

The first assembly parts are produced as follows. First, an integrally molding process in which the housing 1 and the terminal 4 are integrally formed by insert molding is performed. Then, the cushion 7 is fitted into the cushion-mounting recess 13 formed on the inner wall of the housing 1. Subsequently, the one end 41 of the terminal 4 and the other end 52 of the connecting metal piece 5 are joined, and at the same time the cushion 7 is sandwiched between the inner wall surface of the housing 1 and the one end 51 of the connecting metal piece 5. Thus, the first assembly parts are produced by integrally forming the housing 1, the terminal 4, the connecting metal piece 5 and the cushion 7.

Meanwhile, the second assembly parts are produced by arranging the electronic circuit 3 and the O-ring or the like (not shown) in predetermined positions on the inner wall surface of the joint 2.

After the assembly parts production process has been completed, at least either of the one end 51 of the connecting metal piece 5 of the first assembly parts or the electrode 31 of the electronic circuit 3 of the second assembly parts is coated with the conductive adhesive.

Then, the pressure sensor assembly process is performed.

First, the housing 1 and the joint 2 are joined such that the protrusion 11 of the housing 1 in the first assembly parts is fitted into the recess 21 of the joint 2 in the second assembly parts, thus the first assembly parts and the second assembly parts are joined (refer to FIG. 2).

As described above, the protrusion 11 are fitted into the recess 21, and thus, the relative position between the housing 1 and the joint 2 is uniquely determined. Then, a relative position between the one end 51 of the connecting metal piece 5 integrally formed with the housing 1 and the electrode 31 of the electronic circuit 3 integrally formed with the joint 2 is also uniquely determined by fitting the protrusion 11 into the recess 21. According to the present embodiment, the protrusion 11 and the recess 21 are formed such that the one end 51 of the connecting metal piece 5 and the electrode 31 of the electronic circuit 3 are in contact with each other when the protrusion 11 are fitted into the recess 21. Therefore, when the first assembly parts and the second assembly parts are joined by fitting the protrusion 11 into the recess 21, the one end 51 of the connecting metal piece 5 and the electrode 31 of the electronic circuit 3 are in contact with each other accordingly. Since at least one of the one end 51 and the electrode 31 is coated with the conductive adhesive, both of the one end 51 and the electrode 31 are bonded together by adhesion force thereof and electrically connected.

The one end 51 and the electrode 31 that are in contact with each other are biased from the upper side (in FIG. 1) by the cushion 7. Thus, the one end 51 and the electrode 31 can be kept in contact with each other while the conductive adhesive is cured to complete bonding of the one end 51 and the electrode 31 together.

The process described above constitutes a joining process to join the housing 1 and the joint 2 in a state that the one end 51 of the connecting metal piece 5 is in contact with the electrode 31 of the electronic circuit 3 provided inside the joint 2 and the one end 51 is biased to the electrode 31 by the cushion 7.

Then, a caulking process is performed following the processes described above.

A caulking process is a process to caulk the joining portion between the housing 1 and the joint 2 that are joined with each other as described above. A caulking portion 22 is formed on the joint 2 in the caulking process. At this time, the joining portion between the housing 1 and the joint 2 is sealed by the O-ring that is annularly fitted between the housing 1 and the joint 2.

The pressure sensor shown in FIG. 1 is manufactured by the processes described above.

According to the embodiment, the following functions and advantages will be achieved.

(1) In the embodiment, since the one end 51 of the connecting metal piece 5 is biased to the electrode 31 of the electronic circuit 3 by the cushion 7, both of the one end 51 and the electrode 31 are in contact with each other by biasing force thereof and thus electrically connected. Thereby, the electrode 31 and the one end 51 can be in contact with each other and electrically connected even without welding the electrode 31 and the one end 51. Therefore, welding portions can be reduced and handling time and costs for welding can be saved, which enhances productivity to produce pressure sensors at low cost according to the embodiment.

(2) According to the present embodiment, the cushion 7 with a simple arrangement is employed as the biasing unit. The cushion 7 is made of silicon rubber which can be easily obtained in the market and processed. Therefore, according to the present embodiment, the biasing unit can be simplified and the pressure sensor can be easily produced at low cost.

(3) In the present embodiment, the one end 51 of the connecting metal piece 5 and the electrode 31 of the electronic circuit 3 are in contact with each other more firmly by adhesion force of the conductive adhesive 6. Therefore, such possibility can be reduced that the contact between the both is disengaged and the electrical connection is released, resulting in less possibility of pressure sensor failures due to electrical disconnection.

(4) If an amount of the conductive adhesive 6 is too much when the one end 51 of the connecting metal piece 5 and the electrode 31 of the electronic circuit 3 are bonded by the conductive adhesive 6, excess conductive adhesive may overflow the adhering part. When the overflowed conductive adhesive is, for instance, stuck to a part other than the electrode 31 on the electronic circuit 3, the electronic circuit 3 may be short-circuited, causing a failure of the pressure sensor since the conductive adhesive has conductivity.

In the present embodiment, however, since the notch 51A as the conductive adhesive storage is provided, such possibility that the overflowed conductive adhesive from the adhering part between the one end 51 of the connecting metal piece 5 and the electrode 31 of the electronic circuit 3 is, for instance, stuck to the part other than the electrode 31 on the electronic circuit 3 is reduced. Thus, according to the present embodiment, the possibility of a failure of the pressure sensor can be reduced.

(5) In manufacturing the pressure sensor according to the present embodiment, the housing 1 and the joint 2 are joined with each other. Since the housing 1 is provided with the connecting metal piece 5 through the terminal 4 and the joint 2 is provided with the electronic circuit 3, the one end 51 of the connecting metal piece 5 and the electrode 31 of the electronic circuit 3 are in contact with each other and electrically connected accordingly when the housing 1 and the joint 2 are joined. In the present embodiment as described above, the two processes can be integrated into one process; that is, the process to join the housing 1 and the joint 2 and the process to bring the one end 51 of the connecting metal piece 5 into contact with the electrode 31 of the electronic circuit 3. Therefore, according to the present embodiment, the manufacturing process of the pressure sensor can be simplified, improving productivity thereof.

(6) The one end 51 of the connecting metal piece 5 and the electrode 31 of the electronic circuit 3 can be electrically connected with each other properly by means of the protrusion 11 and the recess 21 of the present embodiment, although it is not possible to confirm visually, from outside of the pressure sensor, whether the one end 51 of the connecting metal piece 5 and the electrode 31 of the electronic circuit 3 come in contact with each other in a desired state when the housing 1 and the joint 2 are joined. The housing 1 and the joint 2 are joined with each other by fitting the protrusion 11 into the recess 21. In other words, the protrusion 11 and the recess 21 uniquely determine the relative position between the housing 1 and the joint 2. Since the housing 1 is provided with the connecting metal piece 5 through the terminal 4 and the joint 2 is provided with the electronic circuit 3, the protrusion 11 and the recess 21 further uniquely determine the relative position between the one end 51 of the connecting metal piece 5 and the electrode 31 of the electronic circuit 3. With such a unique relationship as described above, the one end 51 of the connecting metal piece 5 and the electrode 31 of the electronic circuit 3 can securely be in contact with each other and electrically connected when fitting the protrusion 11 into the recess 21.

(7) In the manufacturing method of the present embodiment, the one end 51 of the connecting metal piece 5 and the electrode 31 of the electronic circuit 3 need not be welded in the pressure sensor assembly process. Therefore, welding portions can be reduced, so that handling time and costs for welding can be saved, which enhances productivity to produce the pressure sensor at low cost.

(8) In the present embodiment, an integrally formed component (first assembly parts) is produced, including the housing 1, the terminal 4, the connecting metal piece 5 and the like. In assembling the pressure sensor using the integrally formed component, it is only required to join and caulk the first assembly parts and the second assembly parts. Thus, only one process is performed to assemble the pressure sensor. Therefore, according to the embodiment, the assembling process of the pressure sensor can be simplified, resulting in enhancing the productivity thereof.

(9) In the present embodiment, the joining portion between the housing 1 and the joint 2 is caulked so that the housing 1 and the joint 2 can be fixed in the joined state. In comparison with a case that the joining portion between the housing 1 and the joint 2 is welded for fixing, the housing 1 and the joint 2 can be joined and fixed to each other with an inexpensive and simple process. Therefore the pressure sensor can be manufactured easily at low cost.

(10) In the present embodiment, the housing 1 and the terminal 4 are integrally formed by insert molding. Thus, a gap between the housing 1 and the terminal 4 can be eliminated, which reduces the invasion of water or dust into the main body case. Therefore, failures of the pressure sensor can be prevented.

(11) Furthermore, since the housing 1 and the terminal 4 are integrally formed by insert molding, the other end 42 of the terminal 4 can be positioned relative to the housing 1 with high accuracy. When positioning accuracy of the other end 42 is not sufficient, it is difficult to connect the counterpart terminal to the other end 42. If the other end 42 and the counterpart terminal are forcibly connected with each other, an excessive force may be applied to both of the other end 42 and the counterpart terminal, which therefore may causes failures of both the other end 42 and the counterpart terminal. According to the present embodiment, however, such problem can be prevented, and the other end 42 and the counterpart terminal can be connected with each other, resulting in enhancing reliability of the electrical connection between the other end 42 and the counterpart terminal.

It should be noted that the present invention is not limited to the embodiment described above but includes various modifications and improvements in the scope that an object of the present invention can be achieved.

For instance, in the embodiment described above, the cushion 7 is made of silicon rubber, but various sorts of rubber, metals with elasticity or the like can be used, and in short, any material with elasticity can be used.

Further, in the embodiment described above, the cushion 7 is used as a biasing unit, but may alternatively be used as, for instance, a spring in the present invention. It should be noted that a metallic spring is preferably finished with insulation coating with insulating resins or the like when the metallic spring is used as a biasing unit. This is because electrical connection between the spring and the connecting metal piece 5 is preferably prevented since the spring is in contact with the connecting metal piece 5 that transmits electrical signals.

Furthermore, in the embodiment described above, the one end 51 of the connecting metal piece 5 and the electrode 31 of the electronic circuit 3 are bonded by the conductive adhesive 6, but in the present invention, the conductive adhesive is not necessarily needed on the condition that the one end 51 and the electrode 31 are in contact with each other with sufficient biasing force by the biasing unit (cushion 7).

In the embodiment described above, the notch 51A is formed as the conductive adhesive storage, but in the present invention, for instance, one or a plurality of grooves, holes or recess may be formed as the conductive adhesive storage at the one end 51 of the connecting metal piece 5. In addition, the grooves, the holes and the recess may be formed at the electrode 31 of the electronic circuit 3.

In the embodiment described above, the protrusion 11 is formed in the housing 1 and recess 21 is formed in the joint 2 respectively, but in the present invention, the recess may be formed in the housing and the protrusion may be formed in the joint 2 respectively.

Moreover, a shape of the protrusion 11 is not limited to the substantial rectangular-solid shape. For instance, the shape may be a triangular prism shape. In this case, the recess 21 may have a shape that can be engaged to the protrusion 11.

The priority application Number JP2004-100133 upon which this patent application is based is hereby incorporated by reference.

What is claimed is:

1. A pressure sensor, comprising:
 a main body case;
 an electrical circuit housed inside the main body case to convert a detected pressure into electrical signals and send out the electrical signals;
 an electrical signal transmitting device including one end being in contact with the electrical circuit and the other end disposed outside the main body case to transmit the electrical signals sent out by the electrical circuit from the one end to the other end; and
 a biasing unit to bias the one end of the electrical signal transmitting device to the electrical circuit,
 wherein,
 the main body case is formed by joining a first case part and a second case part with each other,
 the electrical signal transmitting device is provided by penetrating the first case part,
 the electrical circuit is attached to the second case part,
 either one of the first case part or the second case part is provided with a protrusion, and
 either the other one of the first case part or the second case part is provided with a recess that is fitted to the protrusion.

2. The pressure sensor according to claim 1, wherein the biasing unit is an elastic member provided between an inner wall surface of the main body case and the one end of the electrical signal transmitting device.

3. The pressure sensor according to claim 1, wherein the one end of the electrical signal transmitting device and the electrical circuit are bonded by a conductive adhesive having conductivity.

4. The pressure sensor according to claim 3, wherein a conductive adhesive storage is provided adjacent to an adhering part between the one end of the electrical signal transmitting device and the electrical circuit to store the conductive adhesive that overflows the adhering part.

5. A manufacturing method of a pressure sensor,
 the pressure sensor including a main body case; an electrical circuit housed inside the main body case to convert a detected pressure into electrical signals and send out the electrical signals; an electrical signal transmitting device including one end being in contacted with the electrical circuit and the other end disposed outside the main body case to transmit the electrical signals sent out by the electrical circuit from the one end to the other end; and a biasing unit to bias the one end of the electrical signal transmitting device to the electrical circuit,
 wherein the main body case is formed by joining the first case part and the second case part with each other,
 the method comprising the steps of:
 integrally forming the first case part and the electrical signal transmitting device; and
 joining the first case part and the second case part with each other in a state that the one end of the electrical signal transmitting device is in contact with the electrical circuit provided inside the second case part, and the one end of the electrical signal transmitting device is biased to the electrical circuit by the biasing unit.

6. The manufacturing method of the pressure sensor according to claim 5, further comprising a step of:
 caulking the joining portion between the first case part and the second case part.

* * * * *